United States Patent
De Cataldo et al.

(10) Patent No.: US 11,394,205 B2
(45) Date of Patent: Jul. 19, 2022

(54) SYSTEM TO ENERGIZE LOADS WITH ALTERNATING CURRENT IN A PHOTOVOLTAIC PLANT

(71) Applicant: CONVERT TECH S.R.L., Rome (IT)

(72) Inventors: Marco De Cataldo, Rome (IT); Antonio Timidei, Rome (IT); Gian Paolo Perusini, Rome (IT)

(73) Assignee: CONVERT TECH S.R.L., Rome (IT)

( * ) Notice: Subject to any disclaimer, the term of this patent is extended or adjusted under 35 U.S.C. 154(b) by 0 days.

(21) Appl. No.: 16/612,604

(22) PCT Filed: May 11, 2018

(86) PCT No.: PCT/IB2018/053304
§ 371 (c)(1),
(2) Date: Nov. 11, 2019

(87) PCT Pub. No.: WO2018/207148
PCT Pub. Date: Nov. 15, 2018

(65) Prior Publication Data
US 2020/0203954 A1    Jun. 25, 2020

(30) Foreign Application Priority Data

May 12, 2017 (IT) .................... 102017000051937
Jun. 1, 2017 (IT) .................... 102017000060644

(51) Int. Cl.
*H02J 3/38* (2006.01)
*H02J 11/00* (2006.01)
(Continued)

(52) U.S. Cl.
CPC ...... *H02J 3/38* (2013.01); *H02J 1/10* (2013.01); *H02J 3/02* (2013.01); *H02J 11/00* (2013.01)

(58) Field of Classification Search
CPC ...... H02J 1/10; H02J 11/00; H02J 3/02; H02J 3/38; H02J 3/381; H02J 3/383; H02J 2300/24; Y02E 10/56
(Continued)

(56) References Cited

U.S. PATENT DOCUMENTS

| | | | |
|---|---|---|---|
| 2011/0221273 A1* | 9/2011 | Thompson | H02J 3/383 307/43 |
| 2012/0188806 A1 | 7/2012 | Tamura et al. | |

(Continued)

FOREIGN PATENT DOCUMENTS

| | | | |
|---|---|---|---|
| EP | 2587623 A1 | 5/2013 | |
| EP | 2926431 A1 | 10/2015 | |

(Continued)

*Primary Examiner* — Toan T Vu
(74) *Attorney, Agent, or Firm* — Volpe Koenig (57) ABSTRACT

A system is presented to energize electrical loads with alternating current in a photovoltaic plant having a main DC power line, a photovoltaic generator including a photovoltaic circuit that is made up of photovoltaic strings connected in parallel to the main DC power line and generates a first direct current and a direct DC voltage, and, a main AC power line connected to an electric distribution network. The system includes a converter apparatus connected to the main AC power line and to the main DC power line and converts an alternating current circulating in the main AC power line into a second direct current, feeding it into the photovoltaic circuit through the main DC power line if the DC voltage generated by the photovoltaic generator is below a pre-set limit, so as to energize the photovoltaic generator.

20 Claims, 2 Drawing Sheets

(51) Int. Cl.
*H02J 1/10* (2006.01)
*H02J 3/02* (2006.01)

(58) Field of Classification Search
USPC .......................................... 307/83
See application file for complete search history.

(56) References Cited

U.S. PATENT DOCUMENTS

| | | | |
|---|---|---|---|
| 2012/0217800 A1* | 8/2012 | Heidenreich | H02J 3/381 |
| | | | 307/26 |
| 2014/0049105 A1 | 2/2014 | Ragavanis | |
| 2016/0231010 A1 | 8/2016 | Zhao et al. | |
| 2016/0322827 A1* | 11/2016 | Gupta | H02J 3/46 |
| 2018/0287556 A1* | 10/2018 | Tao | H02H 7/20 |

FOREIGN PATENT DOCUMENTS

| | | |
|---|---|---|
| WO | 2013077124 A1 | 5/2013 |
| WO | 2014090273 A1 | 6/2014 |

* cited by examiner

SYSTEM TO ENERGIZE LOADS WITH ALTERNATING CURRENT IN A PHOTOVOLTAIC PLANT

This invention refers to a system to energise electrical loads with alternating current in a photovoltaic plant.

The invention is also directed to a method to energise with alternating current electrical loads of a photovoltaic plant and to a photovoltaic plant comprising such a system.

The system according to the invention finds a particular, even though not yet exclusive, application in the technical sector of the planning and production of photovoltaic plants, in particular of large photovoltaic plants, which is to say, which are capable of producing power that is greater than, or equal to, 100 kW.

Typically, large photovoltaic plants are supplied with a plurality of centralised inverters, housed in climate-controlled cabins and rooms, which are linked to the medium-voltage power distribution network and to a respective group of photovoltaic modules to convert direct current generated by said modules into alternating current to be fed to the distribution network.

The photovoltaic plants are generally supplied with a plurality of electrical devices powered with alternating current, such as video surveillance cameras, perimeter sensors of alarm installations, lighting devices, photovoltaic trackers and various kinds of sensors (irradiation, wind, temperature, etc.) which can be placed in various points of the plant, including at hundreds of meters from the central inverter, which is to say, at hundreds of meters from the connectors of the energy distribution network from which the energy to power them can be drawn.

A first solution for the problem of powering such devices is that of foreseeing the installation of new power lines is able to connect the aforementioned electrical devices directly to the power distribution network. The Applicant, however, has observed that this solution implies a complex and expensive excavation endeavour with the positioning of a large number of considerably long, new electric cables which make it financially disadvantageous.

A second known solution to the aforementioned problem is that of powering the electrical devices with batteries, which are in turn recharged in various ways. However, the Applicant has observed that this solution entails a considerable increase of the costs for the implementation and maintenance of the photovoltaic plant, due to the useful lifespan of the batteries, which, at approximately 1 to 4 years, is limited in comparison to that of the electrical devices being served, this on top of the cost of the batteries themselves, which is typically greater than the value of the electrical devices with power consumption of more than 10 W. Moreover, the widespread placement of the electrical devices makes it difficult to supply the photovoltaic plants with a sufficiently large number of cabins or containers to protect the batteries from the weather or from temperature variations that compromise their useful life.

A sample inverter device is described in EP 2 926 431 A1.

The technical problem at the basis of this invention is, therefore, that of supplying a system to energise electrical loads with alternating current in a photovoltaic plant, a method to energise electrical loads with alternating current in a photovoltaic plant, and a photovoltaic plant comprising such a system that is functionally and structurally conceived to remedy at least one of the complaints relating to the cited prior art.

Within the scope of this problem, one of the purposes of the invention is that of making available a system to energise electrical loads with alternating current in a photovoltaic plant and making available a photovoltaic plant comprising such a system, which are relatively inexpensive to produce.

An additional purpose of the invention is that of making available a system to energise electrical loads with alternating current in a photovoltaic plant and making available a photovoltaic plant comprising such a system which are reliable and preferably durable.

An additional purpose of the invention is that of supplying a photovoltaic plant and a system to energise electrical loads with alternating current in such an installation having minimal structural complexity.

An additional purpose of the invention is that of making available a method to energise, in a simple and reliable manner, AC electrical loads in a photovoltaic plant.

This problem is solved and at least one of these purposes is achieved by means of a system to energise electrical loads with alternating current in a photovoltaic plant, a method to energise electrical loads with alternating current in a photovoltaic plant, and a photovoltaic plant comprising such a system achieved as per the respective independent claims annexed to this description.

Preferred characteristics of the invention are defined in the dependent claims.

According to a first aspect of the invention, the photovoltaic plant comprises a main DC power line, which is to say, a main power line in which direct current can flow, and a main AC power line, which is to say, a main power line in which an alternating current can flow.

The main AC power line can be subjected to AC voltage, preferably low AC voltage (ranging between 50 and 1000 V). The main AC power line can be connected to an electric distribution network capable of supplying AC voltage to the main AC power line. The electric distribution network is preferably of the medium-voltage type, which is to say, an electric network subjected to an AC voltage between 1000 and 42000 V. The main AC power line can be connected to the electric distribution network through a LV/MV (low voltage/medium voltage) transformer cabin.

It should be noted that the connection of the main AC power line to the electric distribution network ensures the continuous presence of an AC voltage in the main AC power line.

The photovoltaic plant furthermore includes a photovoltaic generator comprising a photovoltaic circuit that is made up of one or more photovoltaic strings connected in parallel to the main DC power line. The photovoltaic generator is apt to generate a first direct current and a direct DC voltage when subjected to solar radiation.

The photovoltaic strings are therefore connected to one another in parallel. Preferably, the photovoltaic strings include a plurality of photovoltaic modules connected to one another in series.

Preferably, the generation of the first current and of the DC voltage is based on the physical phenomenon called photovoltaic effect.

More generally, the photovoltaic generator is apt to generate electric power characterised by the first direct current and by the direct DC voltage.

According to an aspect of the invention, the photovoltaic plant, in particular, the photovoltaic generator, is apt to generate power greater than, or equal to, 100 kW.

Preferably, the first direct current, or at least part of it, is fed into the main DC power line. The main DC power line can be subjected to the direct DC voltage supplied by the photovoltaic generator.

A DC/AC inverter, also known as centralised DC/AC inverter, can be connected at the input to the main DC power line and at the output to the main AC power line.

According to an aspect of the invention, the DC/AC inverter is placed, or intended to be placed, between the main AC power line and the main DC power line.

The DC/AC inverter may be housed in a cabinet or a room.

The DC/AC inverter is configured to supply outgoing electric power, in order to feed it into the main AC power line. In particular, the DC/AC inverter is configured to convert a direct current circulating in the main DC power line into an AC alternating current and feed the latter into the main AC power line. Preferably, the DC/AC inverter is configured to supply power to the main AC power line operating at an AC voltage having a frequency and amplitude determined on the basis of pre-set electrical conditions (for example, of the electric distribution network).

In the photovoltaic plant there is at least one electrical load that can be energised with alternating current, preferably at low voltage (for example, 110, 220, 230 or 240 V and 50 or 60 Hz). The photovoltaic plant can include at least one electrical load. Each electrical load can be characterised by a respective nominal power which represents the electric power consumed by the electrical load in its normal operating condition. The electrical load can be an electrical device or a plurality of electrical devices linked to one another in parallel.

Preferably, the aforementioned electrical device can be selected from the group made up of: a video surveillance camera, a perimeter sensor of an alarm installation, a lighting device, a radio link, a Wi-Fi hotspot, a device for the maintenance of the photovoltaic plant (such as, for example, a drill, an angle grinder, a welding machine), a photovoltaic tracker, a sensor, a string controller or any other electrical appliance that is in the vicinity of the photovoltaic generator.

According to an aspect of the invention, the system according to the invention comprises a converter apparatus which is connected, or adapted to be connected, to the main AC power line and to the main DC power line, and configured to convert an alternating current circulating in the main AC power line into a second direct current feeding the latter into the photovoltaic circuit through the main DC power line if the DC voltage generated by the photovoltaic generator is lesser than a pre-set limit, thus energising the photovoltaic generator.

According to an aspect of the invention, the converter apparatus is placed, or intended to be placed, between the main AC power line and the main DC power line.

The pre-set limit can range between 100 V and 1000 V. Preferably, this pre-set limit is equal to 420 V.

Preferably, the system according to the invention comprises means that are able to measure the DC voltage generated by the photovoltaic generator and operatively linked to the converter apparatus.

As previously stated, the electric distribution network ensures the presence of an AC voltage in the main AC power line throughout the entire day, so that the port of the converter apparatus connected to the AC power line can continuously be subject to an AC voltage that is such that it enables the converter apparatus to generate and supply at the output the second direct current and a direct voltage, this both during the daytime and night-time hours of a day.

According to an aspect of the invention, the system comprises a DC/AC secondary converter that is connected, or adapted to be connected, at the input to a secondary DC power line (which is to say, a secondary power line in which a direct current can flow) connected to the connectors (positive and negative) of a photovoltaic module of the photovoltaic generator, or of a circuit formed by a plurality of these photovoltaic modules connected to one another in series, and at the output to the electrical load. The system can comprise said electrical load.

In other words, the secondary DC power line is connected to the connectors of a circuit formed by a photovoltaic module, or by a plurality of photovoltaic modules connected to one another in series, of a photovoltaic string of the photovoltaic generator.

According to an aspect of the invention, the secondary DC power line is connected to the photovoltaic generator upstream from the converter apparatus, in particular upstream from the converter apparatus in relation to the energy flow generated by the photovoltaic generator towards the main DC power line.

According to an aspect of the invention, the secondary DC power line is linked to the photovoltaic generator upstream from the main DC power line, in particular upstream from the main DC power line in relation to the flow of energy generated by the photovoltaic generator towards the DC/AC inverter.

The DC/AC secondary converter is configured to convert a direct current circulating in the secondary DC power line into an alternating supply current, feeding the latter into the electrical load so as to energise it. In this way, the direct current being input to the DC/AC secondary converter, which is to say, the one circulating in the secondary DC power line, is at least partially made of the first current and/or at least partially made up of the second current.

Indeed, it should be noted that the current being input to the DC/AC secondary converter is at least partially made up of the direct current circulating in the photovoltaic circuit, the latter being:

the first current generated by the photovoltaic modules of the photovoltaic generator following solar irradiation, or the second direct current supplied by the converter apparatus to which the first current eventually generated by the photovoltaic generator following solar irradiation is added, depending on whether the value of the DC voltage generated by the photovoltaic generator is greater than or less than or equal to said pre-set limit, which will be explained in greater detail below.

The photovoltaic plant can comprise the system according to the invention. The system according to the invention therefore allows one to energise an electrical load of the photovoltaic plant both by means of the energy produced by the photovoltaic generator following solar irradiation, and by means of the energy coming from the electric distribution network, thus ensuring the proper operation of the electrical load even at night or during periods of limited solar irradiation, for example, at dawn, dusk or during atmospheric disturbances.

Moreover, the system according to the invention is shown to be particularly inexpensive to implement because it exploits the electric path offered by the photovoltaic circuit to energise the electrical load, therefore not requiring additional electric cables connecting the electrical load to the electric distribution network or to the main AC power line.

The provision of the converter apparatus and the DC/AC secondary converter allows one, in fact, to not require the lay-out of new cables of a considerable length and the excavation for their installation for the direct connection between the electrical load and the electric distribution network. The system and the installation according to the invention therefore reveal themselves to be particularly appreciable from the point of view of (minimal) structural complexity.

According to an aspect of the invention, the DC/AC secondary converter is of the galvanic isolation type, so that it does not modify the operating conditions normally imposed by the DC/AC inverter (negative to ground, positive to ground, isolated from grounding, etc.).

Preferably, the system can comprise a secondary AC power line, which is to say, a secondary power line in which an alternating current can flow connecting the DC/AC secondary converter to the electric load of the photovoltaic plant.

According to an aspect of the invention, the converter apparatus comprises a main AC/DC converter connected at the input to the main AC power line and at the output to the main DC power line to generate and feed the second direct current into the photovoltaic circuit through the main DC power line so as to energise the photovoltaic generator (302).

In an embodiment of the invention, the converter apparatus comprises the means apt to measure the DC voltage generated by the photovoltaic generator, which are operatively connected to the main AC/DC converter. Alternatively, the means apt to measure the DC voltage generated by the photovoltaic generator are included in the DC/AC inverter, as the latter can be included in the converter apparatus as explained in greater detail below. In particular, the main AC/DC converter is connected at the input to the main AC power line and at the output to the main DC power line in such a way to feed the second direct current into the photovoltaic circuit when the DC voltage generated by the photovoltaic generator is lesser than or equal to a pre-set limit.

Preferably, the pre-set limit coincides with the minimum voltage input to the DC/AC inverter, which allows the latter to operate.

Preferably, the input and output ports of the main AC/DC converter are connected to the main AC power line and, respectively, to the main DC power line by means of respective electric cables.

In the context of this invention, the wording "the main AC/DC converter is connected at the input to the main AC power line and at the output to the main DC power line" means that the main AC/DC converter can be directly or indirectly connected to the main AC power line and to the main DC power line.

Indeed, the photovoltaic plant can comprise a voltage transformer with primary winding connected to the main AC line and with secondary winding connected to the main AC/DC converter. In this case, the main AC/DC converter is connected at the input to the main AC power line through the aforementioned voltage transformer.

Alternatively, the LV/MV transformer cabin which connects the main AC power line to the distribution network can comprise a first winding connected both to the main AC line and to the main AC/DC converter, or it can comprise a first winding connected to the main AC line and a second winding connected to the main AC/DC converter.

According to an aspect of the invention, a cabinet or a room of the photovoltaic plant can contain a plurality of DC/AC inverters. In this case, the main AC/DC converter can have multiple outputs connected to respective main DC lines, with the latter being connected to respective photovoltaic generators.

It should be noted that the connection of the main AC/DC converter to the main AC power line allows the main AC/DC converter to be subjected to the AC voltage that is present in the main AC power line, as the main AC/DC converter is adapted to operate with an input AC voltage equal to the AC voltage that is present in the main AC power line. In this way, the main AC/DC converter can continuously be subjected to an input AC voltage that is such that it enables the main AC/DC converter to generate and supply at the output the second direct current and a direct voltage both during the daytime and night-time hours of a day.

According to an aspect of the invention, the main AC/DC converter is connected at the input to the main AC power line and at the output to the main DC power line in parallel to the DC/AC inverter. In this case, the input and output voltage of the main AC/DC converter corresponds to the output voltage and, respectively to the input voltage of the DC/AC inverter.

According to an aspect of the invention, the converter apparatus comprises the DC/AC inverter, the latter being connected at the input to the main DC power line and at the output to the main AC power line and configured to convert a direct current circulating in the main DC power line into an AC alternating current, feeding the latter into the main AC power line.

Preferably, the main AC/DC converter and the DC/AC inverter are housed inside the same cabinet or room.

According to an alternative embodiment of the invention, the converter apparatus is a device configured to alternatively operate between a first modality (hereinafter referred to as AC/DC converter modality), in which it generates and feeds the second direct current into the photovoltaic circuit through the main DC power line so as to energise the photovoltaic generator, and a second modality (hereinafter referred to as DC/AC inverter modality) in which it converts a direct current circulating in the main DC power line into an alternating current, feeding the latter into the main AC power line.

In this embodiment of the invention, a sole electronic device is therefore foreseen, adapted to operate according to different modalities, which is to say, it works as an AC/DC converter or as a DC/AC inverter depending on whether the DC voltage generated by the photovoltaic generator is lesser or greater than or equal to a pre-set limit.

Preferably, the system according to the invention comprises a processing unit configured to have the converter apparatus operated in the AC/DC converter modality if the DC voltage generated by the photovoltaic generator is lesser than the aforementioned pre-set limit and in the DC/AC inverter modality if the DC voltage is greater than or equal to said pre-set limit.

Preferably, the aforementioned pre-set limit coincides with the minimal input voltage to the port of the converter apparatus which is intended to be connected to the main DC power line which allows the converter apparatus to operate as per the DC/AC inverter modality.

According to an aspect of the invention, a control device is operationally connected to the DC/AC secondary converter, preferably by means of a wireless connection. The control device is configured to activate and deactivate the DC/AC secondary converter on the basis of pre-set time intervals.

Preferably, the control device comprises a memory unit in which the operation periods of the electrical load are memorised. As an example, should the electrical load be made up of one or more lighting devices, the memory unit can include an indication of the evening and night-time hours during which the lighting devices must be active.

This provision allows for the further limitation of the energy consumption of the system according to the invention, activating the DC/AC secondary converter in correspondence with the operation time interval of the respective electrical load.

According to an aspect of the invention, the converter apparatus is configured to supply the main DC power line with electric power that is greater than, or equal to, the nominal power of the electrical load. This provision is particularly useful to ensure a sufficient energisation of the electrical load so that the latter can operate according to its normal operating conditions.

In particular, the main AC/DC converter is configured to supply an electric power output that is greater than the nominal power of the electrical load.

According to an aspect of the invention, the photovoltaic plant comprises a plurality of electrical loads and the system comprises a plurality of AC/DC secondary converters each of which is connected to the input of the connectors of a circuit formed by one or by a plurality of photovoltaic modules connected to one another in series, and at the output to a respective electrical load. In this state, the converter apparatus is configured preferably to supply electric power to the main DC power line that is greater than, or equal to, the sum of the nominal powers of each electrical load. This allows one to ensure the proper operation of the electrical loads in the case in which they are all active in the same time period.

In particular, the main AC/DC converter is configured to supply electric power at the output that is greater than or equal to the sum of the nominal powers of each electrical load.

The plurality of the AC/DC secondary converters is connected at the input to a respective secondary DC power line and at the output to a respective AC secondary power line to energise the respective electrical load.

The system according to the invention is therefore particularly useful for photovoltaic plants which are able to generate power greater than, or equal to, 100 kW, which is to say, photovoltaic plants of considerable dimensions, and therefore very powerful ones, comprising a plurality of electrical loads connected at hundreds of meters from the energy distribution network, which is to say, from the DC/AC inverter.

According to an aspect of the invention, the main AC/DC converter is configured to supply a direct voltage at the output when subjected to the AC voltage present in the main AC power line, in which the direct output voltage from the main AC/DC converter is intended to energise the photovoltaic circuit. In particular, the main AC/DC converter applies a direct voltage to the photovoltaic circuit through the main DC power line.

This provision is particularly useful to ensure the presence over the course of the entire day of a direct voltage at the output ports of the main AC/DC converter and therefore of a direct voltage at the input ports of the DC/AC secondary converter in order to energise the electrical load through at least one part of the second direct current.

According to an aspect of the invention, the main AC/DC converter is configured to supply a direct voltage at the output having a preset Vref value.

More generally, the converter apparatus can be configured to supply the main DC power line with a direct voltage having a preset Vref value.

According to an aspect of the invention, the Vref value is lesser than or equal to the aforementioned pre-set limit. Preferably, the Vref value is equal to 400 V.

Preferably, the main AC/DC converter comprises a controlled rectifier and an input interface which allow the operator to set the Vref value. The Vref value can be set during the system construction stage on the basis of the electrical characteristics of the DC/AC inverter.

According to an aspect of the invention, the Vref value is lesser than a first threshold corresponding to the minimal input voltage to the DC/AC inverter required for its operation.

Preferably, the aforementioned pre-set limit is greater than, or equal to, the Vref value, more preferably greater than, or equal to, the first threshold.

Preferably, the Vref value is lesser than the first threshold by at least 20 V. In other words, the DC/AC inverter is enabled to operate for input voltages comprised between the first threshold and a higher Vmax voltage. With voltage at its input ports lesser than the first threshold, the DC/AC inverter is inactive, which is to say, it stops working.

The first threshold can be comprised between 100 V and 1000 V. Preferably, the first threshold is equal to 420 V.

Preferably, the Vmax voltage is equal to 1500 V.

It follows that the direct voltage generated by the main AC/DC converter is such that it places or maintains the DC/AC inverter in an inactive state, which is to say, it is such that it will not activate the DC/AC inverter.

This provision therefore allows the non-activation of the DC/AC inverter through the direct voltage supplied by the main AC/DC converter in the case in which the photovoltaic generator supplies a direct DC voltage lesser than the first threshold, a condition which, for example, occurs during the night-time hours. The contemporaneous operation of the DC/AC inverter and of the main AC/DC converter could, in fact, provoke reciprocal interferences that are such that they could cause the improper operation of the photovoltaic plant.

According to an aspect of the invention, the Vref value is greater than a second threshold corresponding to the minimal voltage at the input to the DC/AC secondary converter for its operation. Preferably, the Vref value is greater than the sum of the second threshold and the voltage drops in the photovoltaic circuit.

Preferably, the Vref value is greater than the second threshold by at least 20 V. In other words, the DC/AC secondary converter is enabled to operate for input voltages comprised between the second threshold and Vmax. With voltages at its input ports that are lesser than the second threshold, the DC/AC secondary converter is inactive, which is to say, it stops operating. The second threshold can be comprised between 60 V and 960 V.

Preferably, the second threshold is equal to 380 V.

The fact that the Vref value is greater than the second threshold allows for the compensation of the eventual voltage drops in the photovoltaic circuit, ensuring the proper operation of the DC/AC secondary converter including in the case of an active main AC/DC converter, which is to say, one that supplies direct output voltage at the Vref value.

According to an aspect of the invention, the system comprises a switching device by means of which the main AC/DC converter is connected to the main DC power line, with the switching device being configured to selectively connect and disconnect the main AC/DC converter from and to the main DC power line if the DC voltage generated by the photovoltaic generator is less than and, respectively greater than, or equal to, the Vref value.

This solution is particularly useful to control both the energisation of the photovoltaic circuit by means of the main AC/DC converter, as well as the input voltage supplied to the DC/AC inverter, without needing to manage the activation and deactivation of the main AC/DC converter.

Indeed, this provision allows one to keep the main AC/DC converter active by means of the AC voltage present in the main AC power line, allowing it to energise the photovoltaic circuit should the DC voltage be lesser than the Vref value. Under this circumstance, the DC/AC inverter is subjected to a voltage that is equal to or lesser than the Vref value, which means that it is inactive.

On the contrary, which is to say, with DC voltage produced by the photovoltaic generator greater than, or equal to, the Vref value, the main AC/DC converter, even though it is subjected to the AC voltage present in the main AC power line, is disconnected from the main DC power line so that the photovoltaic generator can subject the DC/AC inverter to the DC voltage so that the latter converts the energy produced by the photovoltaic generator into alternating electric energy which is intended to be fed into the electric energy distribution network.

Preferably, the switching device comprises a switching element and the means able to measure the DC voltage operatively connected to the switching element to selectively connect and disconnect the main AC/DC converter to and from the main DC power line.

According to an aspect of the invention, the switching device can comprise a blocking electric circuit provided with at least one blocking diode (or another electronic device), with the blocking electric circuit being connected to the main DC power line and to the main AC/DC converter in such a way that the blocking diode is directly polarised if the DC voltage is lesser than the Vref value (in this way, connecting the main AC/DC converter to the main DC power line), and is inversely polarised if the DC voltage is greater than, or equal to, the Vref value (in this way, disconnecting the main AC/DC converter from the main DC power line).

Thanks to this characteristic, the main AC/DC converter can be adapted in such a way to uninterruptedly generate an output voltage having a Vref value in the case of alternating input voltage, with the output voltage of the main AC/DC converter energising the photovoltaic circuit when the DC voltage produced by the photovoltaic generator is lesser than the Vref value. Moreover, the provision of the blocking electric circuit allows one to avoid the use of a data processing device provided with one or more internal memories and with a calculation unit capable of intervening in the installation to connect and disconnect the main AC/DC converter selectively to and from the main DC power line on the basis of the DC voltage.

According to an aspect of the invention, the system can comprise, in addition to or alternatively to the aforementioned switching device, a control apparatus that is operatively connected to the main AC/DC converter and configured to activate and deactivate the latter if the DC voltage is lesser than or equal to and, respectively, greater than the pre-set limit, in particular, the first threshold.

In this way, if the DC voltage is lesser than or equal to the pre-set limit, the main AC/DC converter is activated (or kept active if the main AC/DC converter is already in this state), by the control apparatus, so that it can generate the second direct current that is intended to circulate in the photovoltaic circuit and can supply a direct voltage at the output equal to the Vref value. Vice versa, if the DC voltage is greater than the pre-set limit, the main AC/DC converter is deactivated (or kept inactive if the main AC/DC converter is already in this state) by the control apparatus so that it does not generate the second direct current and does not supply direct is voltage at the output.

The control apparatus can be located in the vicinity of the main AC/DC converter and powered by means of the AC voltage of the main AC power line.

The control apparatus can be located inside the cabinet that houses the main AC/DC converter. Preferably, the control apparatus, the main AC/DC converter and the DC/AC inverter are located inside a same cabinet. Alternatively, the control apparatus and the main AC/DC converter are contained in distinct box-shaped units.

More generally, the converter apparatus can comprise the control apparatus and/or the means able to measure the DC voltage generated by the photovoltaic generator.

Preferably, the control apparatus is connected to the photovoltaic plant and comprises the means able to measure the DC voltage. As a function of the measured voltage value, the control apparatus provides to activate or deactivate of the main AC/DC converter. This provision allows the limitation of the energy consumption of the system according to the invention, activating the main AC/DC converter only when the DC voltage is lesser than the Vref value for the purpose of guaranteeing a proper supply of the electrical load.

According to an aspect of the invention, the control apparatus is operatively connected to the DC/AC secondary converter, preferably by means of a wireless connection. The control apparatus is also configured to activate and deactivate the DC/AC secondary converter on the basis of pre-set time intervals, for example, analogously to the control device described above. Preferably, the control apparatus comprises a memory unit in which the periods of operation of the electrical load are memorised. As an example, should the electrical load be formed by one or more lighting devices, the memory unit can include an indication of the evening and night-time hours in which the lighting devices must be active.

This provision allows the further limitation of the energy consumption of the system according to the invention, activating the DC/AC secondary converter in correspondence with the time interval of the operation of the respective electrical load.

According to an aspect of the invention, a method to energise electrical loads with alternating current in a photovoltaic plant as described above can comprise the following steps:

connecting a converter apparatus to the main AC power line and to the main DC power line, connecting a DC/AC secondary converter at the input of the secondary DC power line connected to the connectors of a circuit formed by one or by a plurality of said photovoltaic modules connected to one another in series, and at the output to an electrical load, converting, by means of the converter apparatus, an alternating current circulating in the main AC power line into a second direct current, feeding the latter into the photovoltaic circuit through the main DC power line if the DC voltage generated by the photovoltaic generator is lesser than a pre-set limit, so as to energise the photovoltaic generator, and converting, by means of the DC/AC secondary converter, a direct current circulating in the secondary DC power line into an alternating supply current, feeding the latter into the electrical load so as to energise it.

Preferably, the aforementioned method comprises the step of supply to the main DC power line, by means of the converter apparatus, of electric power greater than, or equal to, the nominal power of the electrical load, or to the sum of the nominal powers of each electrical load.

Preferably, the aforementioned method comprises the step of supply to the main DC power line, by means of the converter apparatus, of a continuous voltage having a Vref value that is lesser than or equal to the pre-set limit.

According to a further embodiment of the invention, a photovoltaic plant comprises a main DC power line, a photovoltaic generator comprising a photovoltaic circuit that is made up of one or more photovoltaic strings connected in parallel to the main DC power line and is able to generate a first direct current and a direct DC voltage, a main AC power line connected to an electric distribution network, a DC/AC inverter connected at the input to the main DC power line and at the output to the main AC power line and an electrical load that can be energised with alternating current. According to an aspect of the invention, a system to energise electrical loads with alternating current in such a photovoltaic plant comprises:

a main AC/DC converter configured to convert an alternating current at the input into a second direct current, this main AC/DC converter being connected at the input to the main AC power line and at the output to the main DC power line to feed the second direct current into the photovoltaic is circuit through the main DC power line so as to energise the photovoltaic generator, and a DC/AC secondary converter configured to convert a direct current at the input into an alternating supply current, this DC/AC secondary converter being connected at the input to the connectors of a photovoltaic module of the photovoltaic generator, or of a circuit formed by a plurality of said photovoltaic modules connected to one another in series, so that the direct current at the input of the DC/AC secondary converter consists of at least one part of said first current and/or at least one part of said second current, and connected at the output to the electrical load to feed said alternating supply current into the electrical load so as to energise it.

It will be appreciated that one or more of the characteristics of the invention that are described above are also applicable to this further embodiment of the system to energise electrical loads with alternating current in a photovoltaic plant.

The characteristics and further advantages of the invention will result more clearly from the detailed description, which follows, of its preferred, though not exclusive, embodiment examples, which are illustrated, as an indication and not exhaustively, with reference to the annexed drawings, in which.

Figure 1:
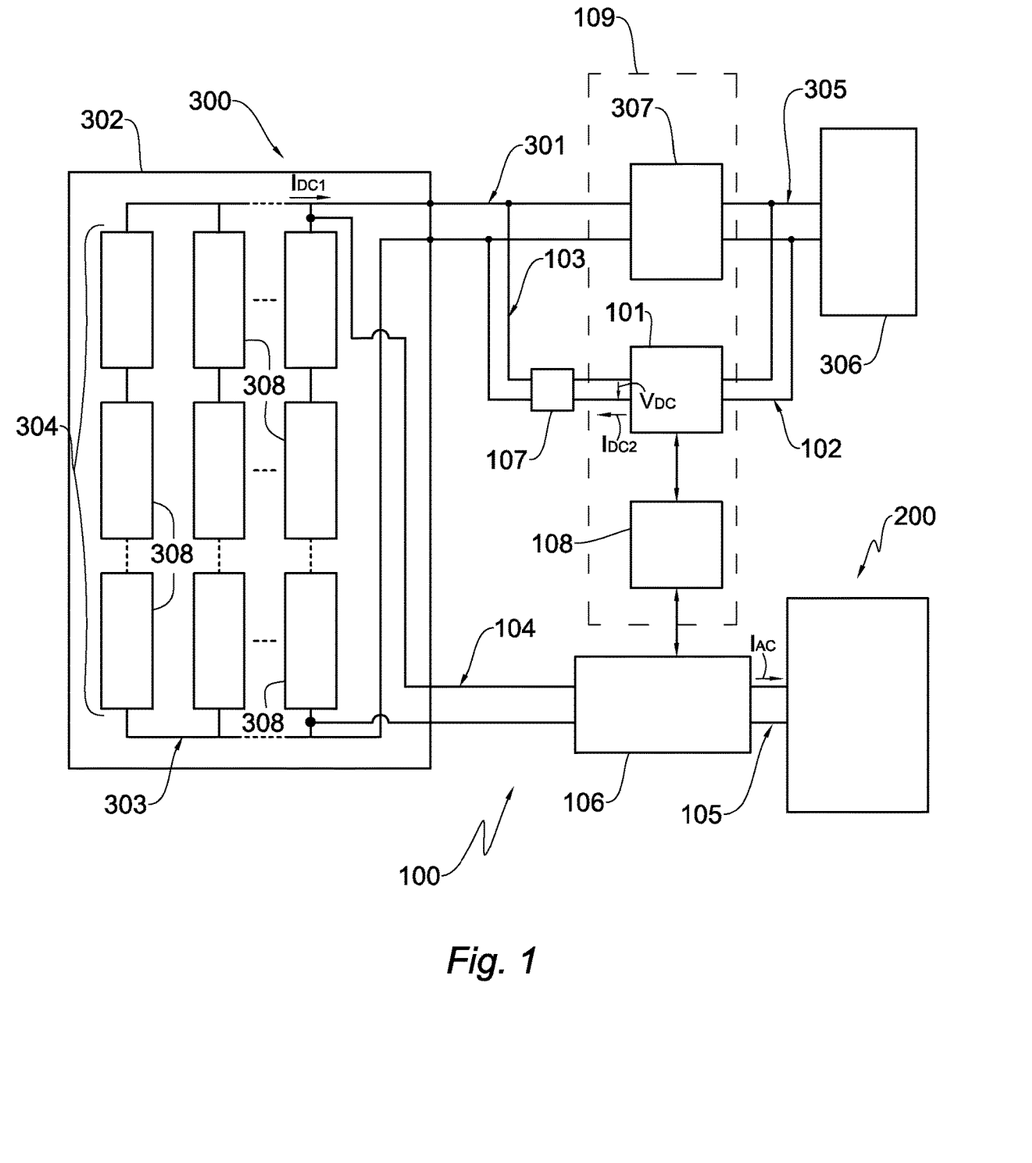
FIG. 1 is a schematic view of a system according to the invention associated with a photovoltaic plant.

In FIG. 1, reference number 100 indicates, as a whole, a system to energise electrical loads 200 with alternating current in a photovoltaic plant 300 according to the invention.

The photovoltaic plant 300 comprises a main DC power line 301 and a photovoltaic generator 302 comprising a photovoltaic circuit 303 that is made up of a plurality of photovoltaic strings 304 connected in parallel to the main DC power line 301 and is able to generate a first direct current IDC1 and a DC voltage.

The photovoltaic plant 300 also comprises a main AC power line 305 connected to an electric distribution network 306.

A DC/AC inverter 307 is connected at the input to the main DC power line 301 and at the output to the main AC power line 305. At least one electrical load 200 that can be energised with alternating current is present in the photovoltaic plant 300. The photovoltaic strings 304 comprise a plurality of photovoltaic modules 308 connected to one another in series.

The main AC power line 305 is subjected to an AC voltage.

The connection of the main AC power line 305 to the electric distribution network 306 ensures the uninterrupted presence of an AC voltage in the main AC power line 305.

The system 100 comprises a converter apparatus 109 connected to the main AC power line 305 and to the main DC power line 301 and configured to convert an alternating current circulating in the main AC power line 305 into a second direct current IDC2, feeding the latter into the photovoltaic circuit 303 through the main DC power line 301 if the DC voltage generated by the photovoltaic generator 302 is lesser than a pre-set limit, so as to energise the photovoltaic generator 302.

Again, in particular reference to FIG. 1, the converter apparatus 109 is comprises a main AC/DC converter 101 connected at the input to the main AC power line 305 and at the output to the main DC power line 301.

It follows that the main AC/DC converter 101 is subjected to the AC voltage of the main AC power line 305. In particular, the main AC/DC converter 101 is connected to the main AC power line 305 by means of a first pair of cables 102 and to the main DC power line 301 by means of a second pair of cables 103.

The main AC/DC converter 101 is configured to convert an alternating current at the input into the second direct current IDC2 which is intended to be fed into the photovoltaic circuit 303 through the main DC power line 301, so as to energise the photovoltaic generator 302. The main AC/DC converter 101 is also configured to supply a direct VDC voltage at the output when it is subjected to the AC voltage that is present in the main AC power line.

The system 100 comprises a secondary DC power line 104 connected to the connectors of a circuit formed by a plurality of photovoltaic modules 308 connected to one another in series.

The secondary DC power line 104 is therefore connected to the connectors of a circuit formed by a plurality of photovoltaic modules 308, connected to one another in series, of a photovoltaic string 304 of the photovoltaic generator 302.

The converter apparatus 109 comprises also a DC/AC inverter 307 connected at the input to the main DC power line 301 and at the output to the main AC power line 305 and configured to convert a direct current circulating in the main DC power line 301 into an AC alternating current, feeding the latter into the main AC power line 305. The main AC/DC converter (101) and the DC/AC inverter 307 are housed inside the same cabinet.

The system 100 comprises also the DC/AC secondary converter 106 adapted to be connected at the input to the secondary DC power line 104 and at the output to the electrical load 200, the DC/AC secondary converter 106 being configured to convert a direct current circulating in the secondary DC power line 104 into an alternating supply current IAC, feeding the latter into the electrical load 200 so as to energise it.

In this way, the direct current at the input of the DC/AC secondary converter is made up of at least a part of the first current IDC1 and/or at least of a part of the second current IDC2.

The alternating supply current IAC is therefore intended to be fed into the electrical load 200 through the secondary AC power line 105 so as to energise the electrical load 200.

Advantageously, the system 100 allows the distribution network 306 to energise the electrical load 200 through the photovoltaic generator 302.

The main AC/DC converter 101 is moreover configured to supply, at the output, electric power that is greater than, or equal to, the nominal power of the electrical load 200. In this way, in particular, the proper operation of the electrical load 200 is ensured.

Additionally, the main AC/DC converter 101 is configured to supply a direct voltage at the output having a preset Vref value, the Vref value being lesser than the first threshold V1, corresponding to the minimum voltage at the input of the DC/AC inverter 307 needed for its operation and it being is greater than the second threshold V2, corresponding to the minimum voltage at the input of the DC/AC secondary converter 106 needed for its operation.

Preferably, the Vref value is greater than the sum of the second threshold V2 and the voltage drops in the photovoltaic circuit 303. In this way, electrical interference is prevented between the DC/AC inverter 307 and the main AC/DC converter 101 and the proper activation of the DC/AC secondary converter 106 is ensured.

With reference to FIG. 1, the system 100 comprises a switching device 107, through which the main AC/DC converter 101 is connected to the main DC power line 301. The switching device 107 comprises a blocking electric circuit provided with at least one blocking diode. The switching device 107 is laid out in such a way that the blocking diode is directly polarised if the DC voltage generated by the photovoltaic generator 302 is lesser than the Vref value and is indirectly polarised if the DC voltage is greater than, or equal to, the Vref value.

With DC voltage lesser than the Vref value, the main AC/DC converter 101 is electrically connected to the main DC power line so that the second current IDC2 can circulate in the photovoltaic circuit 303. The second current IDC2, to which the first current IDC1 eventually generated by the photovoltaic generator 302 is added, is at least partially converted into alternating current by the DC/AC secondary converter and consumed by the electrical load 200 when the latter is placed in operation.

Vice versa, with DC voltage greater than, or equal to, the Vref value, the main AC/DC converter 101 is electrically disconnected from the main DC is power line. The first current IDC1 circulating in the photovoltaic circuit 303 is at least partially converted into alternating current by the DC/AC secondary converter and consumed by the electrical load 200 when the latter is placed in operation.

In this specific case, the aforementioned pre-set limit therefore coincides with the Vref value.

In addition, or as an alternative, to the switching device 107, the system 100 according to the invention comprises a control apparatus 108 that is operationally connected to the main AC/DC converter 101 and configured to activate and deactivate the latter if the DC voltage is lesser and, respectively, greater than, or equal to, the value of the first threshold.

In the case in which the DC voltage is lesser than the first threshold, the main AC/DC converter 101 is therefore activated (or kept active if the main AC/DC converter 101 is already in this state) by the control apparatus 108, so that it can feed into the photovoltaic circuit 303 the second current to energise the electrical load 200. Vice versa, if the DC voltage is greater than, or equal to, the first threshold, the main AC/DC converter 101 is deactivated (or kept inactive if the main AC/DC converter 101 is already in this state) by the control apparatus 108, so that it does not generate the second direct current and it does not supply direct voltage at the output. In this case, the electrical load 200 is energised by the energy produced by the photovoltaic generator 302.

The control apparatus 108 is operatively connected also to the DC/AC secondary converter 106 through a wireless connection, with the control apparatus 108 being configured to activate and deactivate the DC/AC is secondary converter 106 on the basis of pre-set time intervals. This expedient allows for the limitation of the energy consumption of the system according to the invention.

Figure 2:
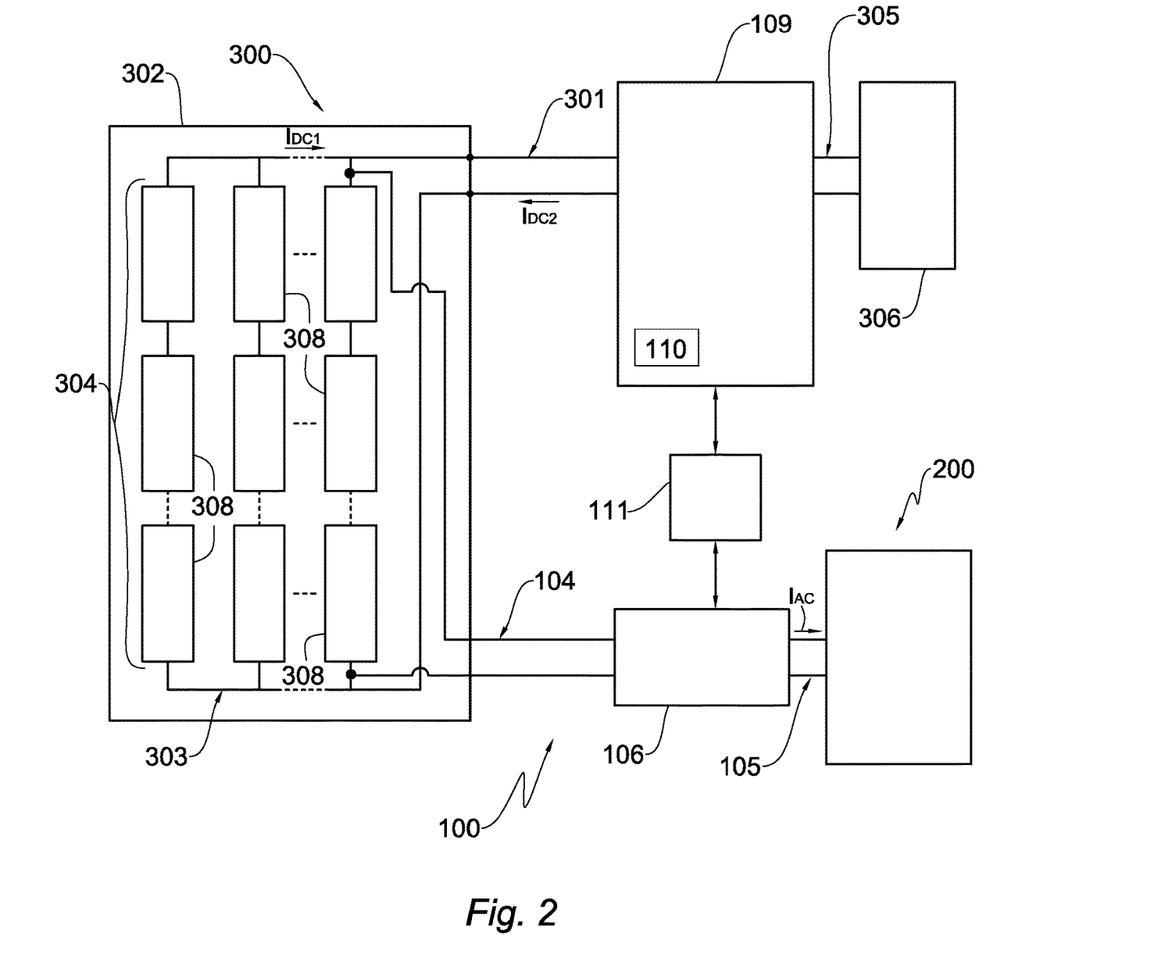
FIG. 2 is a schematic view of a further embodiment of the system according to the invention.

FIG. 2 shows an alternative embodiment of the invention.

The elements of this embodiment of the invention, which correspond in their structure and/or function to those of the embodiment of the invention of FIG. 1, will be indicated below with the same terminology and with the same numerical references.

In particular, the system 100 of FIG. 2 differs from the system of FIG. 1 due to the fact that the converter apparatus 109 is a device configured to alternatively operate either in an AC/DC converter modality, in which it generates and feeds the second direct current IDC2 into the photovoltaic circuit 303 through the main DC power line 301, so as to energise the photovoltaic generator 302, or a DC/AC inverter modality in which it converts a direct current circulating in the main DC power line 301 into un alternating current, feeding the latter into the main AC power line 305.

The system 100 of FIG. 2 comprises a processing unit 110 configured to have the converter apparatus 109 operated in the AC/DC converter modality if the DC voltage generated by the photovoltaic generator 302 is lesser than a pre-set limit, and, in the DC/AC inverter modality, if the DC voltage is greater than, or equal to, said pre-set limit. In the specific case, the pre-set limit coincides with a minimum tension at the input of the port of the converter apparatus that is intended to be connected to the main DC power line 301 which allows the converter apparatus to operate according to the DC/AC inverter modality. The system 100 of FIG. 2 moreover is comprises a control device 111, operatively connected to the DC/AC secondary converter 106 through a wireless connection, with the control device 111 being configured to activate and deactivate said DC/AC secondary converter 106 on the basis of pre-set time intervals.

The invention thus solves the problem that was proposed, achieving at the same time a plurality of advantages. In particular, the system according to the invention allows one to energise electrical loads of a photovoltaic plant with alternating current in a relatively inexpensive way.

The invention claimed is:

1. A system to energize electrical loads (200) with alternating current in a photovoltaic plant (300), the photovoltaic plant (300) comprising a main DC power line (301), a photovoltaic generator (302) comprising a photovoltaic circuit (303) that is made up of one or more photovoltaic strings (304) connected in parallel to the main DC power line (301) and is able to generate a first direct current (IDC1) and a direct DC voltage and a main AC power line (305) connected to an electric distribution network (306), said system (100) comprising:

a converter apparatus (109) connected to the main AC power line (305) and to the main DC power line (301)

and configured to convert an alternating current circulating in the main AC power line (305) into a second direct current (IDC2), feeding the second direct current (IDC2) into the main DC power line (301), if the DC voltage generated by the photovoltaic generator (302) is lesser than a pre-set limit, and a DC/AC secondary converter (106) connected at an input to a secondary DC power line (104) which is connected, upstream of the main DC power line (301) with respect to the converter apparatus (109), to connectors of a photovoltaic module (308) of the photovoltaic generator (302), or of a circuit formed by a plurality of said photovoltaic modules (308) connected to one another in series, and at the output to the electrical load (200), said DC/AC secondary converter (106) being configured to convert a direct current circulating in the secondary DC power line (104) into an alternating supply current (IAC), feeding the alternating supply current (IAC) into the electrical load (200) so as to energize the electrical load (200), wherein a DC/AC inverter (307) is connected at the input to the main DC power line (301) and at the output to the main AC power line (305) and is configured to convert a direct current circulating in the main DC power line (305) into an AC alternating current and feed the AC alternating current into the main AC power line (305), wherein said converter apparatus (109) is configured to supply the main DC power line with a direct voltage which has a value lesser or equal to said pre-set limit, the value being lesser than a first threshold.

2. The system according to claim 1, wherein said converter apparatus (109) comprises a main AC/DC converter (101) connected at an input to the main AC power line (305) and at an output to the main DC power line (301) to generate and feed said second direct current (IDC2) into the photovoltaic circuit (303) through the main DC power line (301) so as to energize the photovoltaic generator (302).

3. The system according to claim 2, wherein said converter apparatus (109) comprises a DC/AC inverter (307) connected at the input to the main DC power line (301) and at the output to the main AC power line (305) and configured to convert a direct current circulating in the main DC power line (301) into an AC alternating current, feeding the AC alternating current into the main AC power line (305), wherein said main AC/DC converter (101) and said DC/AC inverter (307) are housed inside a same cabinet.

4. The system according to claim 2, wherein said main AC/DC converter (101) is connected at the input to the main AC power line (305) and at the output to the main DC power line (103) in parallel to the DC/AC inverter (307).

5. The system according to claim 2, wherein said main AC/DC converter (101) is configured to supply a direct voltage (VDC) at the output if the main AC/DC converter (101) is subjected to an alternating voltage present in the main AC power line (305).

6. The system according to claim 1, wherein said converter apparatus (109) is a device configured to operate alternatively between an AC/DC converter modality, in which the converter apparatus (109) generates and feeds said second direct current (IDC2) into the photovoltaic circuit (303) through the main DC power line (301) so as to energize the photovoltaic generator (302), and a DC/AC inverter modality in which the converter apparatus (109) converts a direct current circulating in the main DC power line (301) into an alternating current, feeding the alternating current into the main AC power line (305).

7. The system according to claim 1, wherein said converter apparatus (109) is configured to supply the main DC power line with electric power that is greater than a nominal power of the electrical load (200).

8. The system according to claim 7, wherein said photovoltaic plant (300) comprises a plurality of electrical loads (200) and said system comprises a plurality of said secondary converters (106), each of which is connected at the input to the connectors of a photovoltaic module (308) of the photovoltaic generator (302), or of a circuit formed by a plurality of photovoltaic modules (308) connected to one another in series, and at the output to a respective electrical load (200), said converter apparatus (109) being configured to supply the main DC power line with an electric power greater than, or equal to, the sum of the nominal powers of each electrical load (200).

9. The system according to claim 1, wherein said converter apparatus (109) is configured to supply the main DC power line with a direct voltage which has a value lesser than or equal to said pre-set limit.

10. The system according to claim 9, wherein said value is greater than the minimum voltage that is allowable at the input to said DC/AC secondary converter (106) for operation of the DC/AC secondary converter (106).

11. A system to energize electrical loads (200) with alternating current in a photovoltaic plant (300), the photovoltaic plant (300) comprising a main DC power line (301), a photovoltaic generator (302) comprising a photovoltaic circuit (303) that is made up of one or more photovoltaic strings (304) connected in parallel to the main DC power line (301) and is able to generate a first direct current (IDC1) and a direct DC voltage and a main AC power line (305) connected to an electric distribution network (306), said system (100) comprising:

a converter apparatus (109) connected to the main AC power line (305) and to the main DC power line (301) and configured to convert an alternating current circulating in the main AC power line (305) into a second direct current (IDC2), feeding the second direct current (IDC2) into the main DC power line (301), if the DC voltage generated by the photovoltaic generator (302) is lesser than a pre-set limit, and a DC/AC secondary converter (106) connected at an input to a secondary DC power line (104) which is connected, upstream of the main DC power line (301) with respect to the converter apparatus (109), to connectors of a photovoltaic module (308) of the photovoltaic generator (302), or of a circuit formed by a plurality of said photovoltaic modules (308) connected to one another in series, and at the output to the electrical load (200), said DC/AC secondary converter (106) being configured to convert a direct current circulating in the secondary DC power line (104) into an alternating supply current (IAC), feeding the alternating supply current (IAC) into the electrical load (200) so as to energize the electrical load (200), wherein said converter apparatus (109) is configured to supply the main DC power line with a direct voltage which has a value lesser than or equal to said pre-set limit and wherein said system (100) comprises a switching device (107) through which said main AC/DC converter (101) is connected to the main DC power line (301), said switching device (107) being configured to selectively connect and disconnect said main AC/DC converter (101) to and from the main DC power line if the DC voltage generated by the photovoltaic generator (302) is lesser and, respectively, greater than, or equal to, said value.

12. The system according to claim 11, wherein said switching device (107) comprises a blocking electric circuit provided with at least one blocking diode, said blocking electric circuit being connected to the main DC power line (301) and to said main AC/DC converter (101) in such a way that said blocking diode is:
    directly polarized if said DC voltage is lesser than said value, connecting in this way said main AC/DC converter (101) to the main DC power line (301), and is inversely polarized if said DC voltage is greater than, or equal to, said value, disconnecting in this way said main AC/DC converter (101) from the main DC power line (301).

13. The system according claim 2, wherein said system (100) further comprises a control apparatus (108) operatively connected to said main AC/DC converter (101) and configured to activate and deactivate the main AC/DC converter (101) if said DC voltage is lesser than or equal to and, respectively, greater than said pre-set limit.

14. The system according to claim 13, in which said control apparatus (108) is operatively connected to said DC/AC secondary converter (106) through a wireless connection, said control apparatus (108) being configured to activate and deactivate said DC/AC secondary converter (106) based on pre-set time intervals.

15. The system according to claim 6, wherein said system further comprises a processing unit (110) configured to have said converter apparatus (109) operated in said AC/DC converter modality, if the DC voltage generated by the photovoltaic generator (302) is lesser than said pre-set limit, and in said DC/AC inverter modality if said DC voltage is greater than, or equal to, said pre-set limit.

16. The system according to claim 15, comprising a control device (111) operatively connected to said DC/AC secondary converter (106) through a wireless connection, said control device (111) being configured to activate and deactivate said DC/AC secondary converter (106) based on pre-set time intervals.

17. The system according to claim 1, wherein said secondary DC power line (104) is connected to the connectors of a circuit formed by a photovoltaic module (308), or by a plurality of photovoltaic modules (308), connected one to another in series, of a photovoltaic string (304) of said photovoltaic generator (303).

18. A photovoltaic plant (300) comprising:
    a main DC power line (301), a photovoltaic generator (302) comprising a photovoltaic circuit (303) that is made up of one or more photovoltaic strings (304) connected in parallel to the main DC power line (301) and is able to generate a first direct current (IDC1) and a direct DC voltage, a main AC power line (305) connected to an electric distribution network (306), at least one electrical load (200) that can be energized with alternating current, and
    a system (100) to energize electrical loads (200) with alternating current in a photovoltaic plant (300), the photovoltaic plant (300) comprising a main DC power line (301), a photovoltaic generator (302) comprising a photovoltaic circuit (303) that is made up of one or more photovoltaic strings (304) connected in parallel to the main DC power line (301) and is able to generate a first direct current (IDC1) and a direct DC voltage and a main AC power line (305) connected to an electric distribution network (306), said system (100) comprising:
    a converter apparatus (109) connected to the main AC power line (305) and to the main DC power line (301) and configured to convert an alternating current circulating in the main AC power line (305) into a second direct current (IDC2), feeding the second direct current (IDC2) into the main DC power line (301), if the DC voltage generated by the photovoltaic generator (302) is lesser than a pre-set limit, and
    a DC/AC secondary converter (106) connected at an input to a secondary DC power line (104) which is connected, upstream of the main DC power line (301) with respect to the converter apparatus (109), to connectors of a photovoltaic module (308) of the photovoltaic generator (302), or of a circuit formed by a plurality of said photovoltaic modules (308) connected to one another in series, and at the output to the electrical load (200), said DC/AC secondary converter (106) being configured to convert a direct current circulating in the secondary DC power line (104) into an alternating supply current (IAC), feeding the alternating supply current (IAC) into the electrical load (200) so as to energize the electrical load (200),
    wherein a DC/AC inverter (307) is connected at the input to the main DC power line (301) and at the output to the main AC power line (305) and is configured to convert a direct current circulating in the main DC power line (305) into an AC alternating current and feed the AC alternating current into the main AC power line (305), wherein said converter apparatus (109) is configured to supply the main DC power line with a direct voltage which has a value lesser or equal to said pre-set limit, the value being lesser than a first threshold.

19. A method to energize electrical loads (200) with alternating current in a photovoltaic plant (300), the photovoltaic plant (300) comprising a main DC power line (301), a photovoltaic generator (302) comprising a photovoltaic circuit (303) that is made up of one or more photovoltaic strings (304) connected in parallel to the main DC power line (301) and is able to generate a first direct current (IDC1) and a direct DC voltage, and a main AC power line (305) connected to an electric distribution network (306), said method comprising the following steps:
    connecting a converter apparatus (109) to the main AC power line (305) and to the main DC power line (301),
    connecting a DC/AC secondary converter (106) at the input to a secondary DC power line (104), connected, upstream of the main DC power line (301) with respect to the converter apparatus (109), to connectors of a photovoltaic module (308) of the photovoltaic generator (302), or of a circuit formed by a plurality of said photovoltaic modules (308) connected to one another in series, and at the output to the electrical load (200),
    converting, by means of the converter apparatus (109), an alternating current circulating in the main AC power line (305) into a second direct current (IDC2), feeding the second direct current (IDC2) into the main DC power line (301) if the DC voltage generated by the photovoltaic generator (302) is lesser than a pre-set limit, and
    converting, by means of the DC/AC secondary converter (106), a direct current circulating in the secondary DC power line (104) in an alternating supply current (IAC), feeding the alternating supply current (IAC) into the electrical load (200) so as to energize the electrical load (200), wherein a DC/AC inverter (307) is connected at the input to the main DC power line (301) and at the output to the main AC power line (305) and is configured to convert a direct current circulating in the main DC power line (305) into an AC alternating current and feed the AC alternating current into the main AC power line (305), wherein said converter apparatus (109) is configured to supply the main DC power line with a direct voltage which has a value lesser or equal to said pre-set limit, the value being lesser than a first threshold.

20. The system according to claim 1, wherein the photovoltaic generator (302) is configured to generate power greater than, or equal to, 100 kW.

\* \* \* \* \*